(12) United States Patent
Caillot et al.

(10) Patent No.: US 11,919,486 B2
(45) Date of Patent: Mar. 5, 2024

(54) METHOD FOR CLEANING A GLAZED SURFACE OF A MOTOR VEHICLE

(71) Applicant: VALEO SYSTEMES D'ESSUYAGE, La Verriere (FR)

(72) Inventors: Gerald Caillot, La Verriere (FR); Frederic Giraud, La Verriere (FR); Jean-Michel Jarasson, La Verriere (FR); Vincent Izabel, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 0 days.

(21) Appl. No.: 17/779,778

(22) PCT Filed: Nov. 12, 2020

(86) PCT No.: PCT/EP2020/081834
§ 371 (c)(1),
(2) Date: May 25, 2022

(87) PCT Pub. No.: WO2021/104884
PCT Pub. Date: Jun. 3, 2021

(65) Prior Publication Data
US 2023/0001889 A1 Jan. 5, 2023

(30) Foreign Application Priority Data
Nov. 29, 2019 (FR) ...................... 1913552

(51) Int. Cl.
*B60S 1/08* (2006.01)
*B60S 1/24* (2006.01)
(Continued)

(52) U.S. Cl.
CPC ............... *B60S 1/3404* (2013.01); *B60S 1/08* (2013.01); *B60S 1/245* (2013.01); *B60S 1/566* (2013.01)

(58) Field of Classification Search
CPC ...... B60S 1/24; B60S 1/56; B60S 1/34; B60S 1/08
See application file for complete search history.

(56) References Cited

U.S. PATENT DOCUMENTS 6,324,718 B1 * 12/2001 Johnson ................ B60R 1/0602
15/250.003
7,856,693 B1 * 12/2010 Johnson .................... B60S 1/48
359/872

(Continued)

FOREIGN PATENT DOCUMENTS

| DE | 19850639 A1 | 5/1999 |
| JP | H08276827 A | 10/1996 |

(Continued)

OTHER PUBLICATIONS

European Patent Office, International Search Report and Written Opinion of corresponding International Application No. PCT/EP2020/081834, dated Jan. 20, 2021.

(Continued)

*Primary Examiner* — Michael D Jennings
(74) *Attorney, Agent, or Firm* — Valeo Systemes d'Essuyage

(57) ABSTRACT

System for cleaning a glazed surface of a motor vehicle, including at least one wiper and a drive device for driving at least the wiper along an axis of translation, substantially perpendicular to said wiper, where the glazed surface is a detection surface of a sensor/emitter of a detection assembly and in that the drive device includes at least one drive motor driving in rotation about an axis of rotation substantially perpendicular to the axis of translation, and at least a conversion device converting a rotational movement of the drive motor into a rectilinear movement along the axis of translation.

12 Claims, 10 Drawing Sheets

(51) Int. Cl.
*B60S 1/34* (2006.01)
*B60S 1/56* (2006.01)

(56) References Cited

U.S. PATENT DOCUMENTS

| | | |
|---|---|---|
| 2007/0220697 A1 | 9/2007 | Lin |
| 2019/0344758 A1* | 11/2019 | Toyama .................... B60S 1/52 |
| 2020/0094784 A1* | 3/2020 | Herman ................ B60S 1/0848 |

FOREIGN PATENT DOCUMENTS

| | | | |
|---|---|---|---|
| JP | H11142514 A | 5/1999 | |
| JP | 2019031273 A | 2/2019 | |
| WO | 2015003705 A1 | 1/2015 | |
| WO | WO-2015003705 A1 * | 1/2015 | ............ B60S 1/0848 |

OTHER PUBLICATIONS

Japan Patent Office, First Office Action (including English translation) of corresponding Patent Application No. 2022-531511, dated Jul. 6, 2023.

* cited by examiner

METHOD FOR CLEANING A GLAZED SURFACE OF A MOTOR VEHICLE

CROSS-REFERENCE TO RELATED APPLICATIONS

This application is filed under 35 U.S.C. § 371 U.S. National Phase of International Application No. PCT/EP2020/081834 filed Nov. 12, 2020 (published as WO2021104884), which claims priority benefit to French application No. 1913552 filed on Nov. 29, 2019, the disclosures of which are herein incorporated by reference in their entirety.

TECHNICAL FIELD

The present invention relates to a detection assembly for a motor vehicle, and more particularly the invention relates to a cleaning system associated with a sensor/transmitter of such a detection assembly.

BACKGROUND OF THE INVENTION

Vehicles, particularly motor vehicles, increasingly include automated systems, such as driving assistance systems. Such automated systems include in particular at least one detection assembly which comprises one or more sensor(s)/transmitter(s) making it possible to acquire signals representing the surroundings of the vehicle and parameters external to this vehicle as well as at least one control unit configured to interpret the information thus gathered and to make the decisions that need to be made as a result of this information.

BRIEF SUMMARY OF THE INVENTION

Therefore, it will be understood that it is particularly important to check that these sensors/transmitters are operating properly throughout the lifetime of the vehicle. In particular, these sensors/transmitters are most often arranged outside the vehicle, for example carried on the bodywork, and may for example get dirty, possibly making it difficult, or even impossible, to acquire information. It is therefore necessary to provide a cleaning system capable of effectively removing detritus, dirt, organic matter and other disruptive elements.

Such cleaning systems must in particular be adapted to the dimensions of the glazed surface to be cleaned. It is particularly problematic to provide cleaning systems able to properly clean a glazed surface of elongate shape, that is to say with a longitudinal dimension greater than the corresponding transverse dimension. It is thus known practice to provide a cleaning system in which a wiper is driven by a rotary drive motor in a rotary movement around a transverse axis. However, the glazed surface of the sensors/transmitters should be curved, not flat, so that the wiper is pressed firmly against the surface to be cleaned.

Said rotary movement may be a continuous or discontinuous rotary movement.

An alternative, particularly applicable to flat glazed surfaces, is to provide a cleaning system in which the wiper is driven in a longitudinal translational movement, along the largest dimension of the sensor/transmitter, in order to wipe the flat glazed surface thereof. Such cleaning systems may however prove to be bulky, in particular because they require the use of a rod that can be deployed in the direction of translation of the wiper.

The present invention falls within this context and proposes an alternative to systems for cleaning sensors/transmitters of detection assemblies aimed at solving at least the drawbacks which have just been mentioned, wherein said cleaning system may be used to clean a flat or curved glazed surface of a sensor/transmitter.

Another aim of the present invention is to provide a cleaning system affording better performance, in particular by reducing the travel time of the cleaning system on the glazed surface to be cleaned and therefore the time required to clean said glazed surface.

The present invention relates to a cleaning system for cleaning a glazed surface of a motor vehicle, said cleaning system comprising at least one wiper and a drive device for driving at least the wiper along an axis of translation substantially perpendicular to said wiper, characterized in that the glazed surface is a detection surface of a sensor/transmitter of a detection assembly and in that the drive device comprises at least one drive motor for driving in rotation about an axis of rotation substantially perpendicular to the axis of translation, and at least one conversion device for converting the rotary movement of the drive motor into a rectilinear movement along the axis of translation.

The present invention is designed in particular for cleaning glazed surfaces of sensors/transmitters, i.e. glazed surfaces having smaller dimensions than those presented by glazed surfaces associated with the passenger compartment of the vehicle such as a windshield or a rear window. The size of the glazed surface is in particular tailored to the nature of the sensor/transmitter with which it is associated. By way of example, where the detection assembly is an optical assembly and the sensor/transmitter an optical sensor, the longitudinal dimension of the optical surface to be cleaned may be around 300 to 400 mm and the transverse dimension, perpendicular to the longitudinal dimension, may be around 50 to 100 mm.

The cleaning system as it is implemented according to the invention is particularly suitable for cleaning glazed surfaces having an elongate shape, i.e. having a main elongation dimension, in this case corresponding to a longitudinal direction, at least twice as large as the perpendicular, in this case transverse, dimension of the glazed surface.

This glazed surface may be characterized by a flat structure, essentially included in a plane of extension, or may have a curved structure curving around a longitudinal axis corresponding to the axis of the largest dimension of the glazed surface.

The drive device is configured to move the wiper longitudinally in translation between a first end position and a second end position of the glazed surface. By way of example, said end positions may be positioned near two opposite edges of the glazed surface, for example two opposite side edges or two opposite longitudinal edges arbitrarily forming an upper edge and a lower edge. In other words, the drive device is configured to allow a reciprocating movement in longitudinal translation between the two end positions, on the basis of a rotary movement initiated by the rotary drive motor. Such a drive device makes it possible in particular to clean a glazed surface by means of a translational movement particularly suitable for effectively cleaning the entire glazed surface of the sensor/transmitter, using a standard rotary motor arranged on one edge of the glazed surface to be cleaned.

Alternatively, the end positions may delimit a limited area of the glazed surface, for example a field of vision of an optical sensor.

According to one feature of the invention, the conversion device comprises, on the one hand, an articulated connecting member to which the wiper is attached, by means of at least one connector, and on the other hand, a fixed motor articulation point rotationally rigidly secured to an output shaft of the drive motor.

The wiper comprises at least one blade, for cleaning, by wiping, the glazed surface of the sensor/transmitter, and at least one blade holder, which is attached to the conversion device by the connector. In particular, said connector may be centered on the wiper or be arranged at an axial end of said wiper. The arrangement of the conversion device between an articulated connecting member and a fixed motor articulation point makes it possible to convert a rotary movement around an axis passing through the fixed articulation point into a precise translational movement not affected by the mounting tolerances of the cleaning system.

According to one feature of the invention, at least one axial end of the wiper comprises at least one guide member configured to guide the wiper along the axis of translation of this wiper.

The guide member ensures the wiper is held in a direction substantially perpendicular to the axis of translation defining its rectilinear movement so as to prevent the blade from shifting while wiping the glazed surface.

The guide member may, by way of example, be a tab configured to extend parallel to at least one wall of a housing of the sensor/transmitter, said wall carrying the glazed surface to be cleaned. Alternatively, the guide member may be configured to interact with the sensor/transmitter, for example with a channel included in the wall of the housing or in the glazed surface.

According to one feature of the invention, the conversion device comprises at least a connecting rod system and/or a cam.

The connecting rod system comprises a plurality of connecting rods articulated relative to one another. A first connecting rod forms, at a first tip, the fixed motor articulation point and is rotatably mounted on the drive motor. When the first connecting rod is rotated by the drive motor, a second tip, opposite the first tip, defines a circular path.

At least one connecting rod of the connecting rod system, different from the first connecting rod, participates in forming, at the opposite end to the first connecting rod, the articulated connecting member connecting the wiper to the conversion device. In particular, said connecting rod may be directly or indirectly articulated to the first connecting rod.

In one implementation of the conversion device with a cam, the connector ensuring the connection between the wiper and the conversion device may, for example, comprise a pin configured to move along a peripheral edge of the cam or along a groove made in the cam.

The conversion device may comprise a combination of the cam and the connecting rod system, at least one connecting rod of the connecting rod system being connected to the connector and/or comprising the pin configured to interact with the cam.

According to an optional feature of the invention, the connecting rod system comprises at least the first connecting rod, attached to the drive motor to form the fixed motor articulation point, and at least two articulated quadrilaterals of connecting rods, respectively a first quadrilateral of connecting rods and a second quadrilateral of connecting rods, at least the articulated connecting member being common to the first quadrilateral and to the second quadrilateral, the second quadrilateral comprising a fixed point of the conversion device.

In other words, the connecting rod system may consist of a Peaucellier-Lipkin device converting the circular path defined by the second tip of the first connecting rod into a translational movement of the articulated connecting member of the conversion device, so as to drive the wiper along the axis of translation.

According to an optional feature of the invention, the connector may be arranged at a first axial end of the wiper, the at least one guide member being arranged at a second axial end, opposite the first axial end, of said wiper.

In this case, "first axial end" means the end of the wiper closest to the axis of rotation of the drive motor. It follows that the "second axial end" is a distal end of the wiper with respect to the axis of rotation.

According to an optional feature of the invention, the connector may be centered on the wiper, i.e., the connector is equidistant from the first axial end and the second axial end of the wiper.

The alternative in which the connector is centered is particularly suitable for cleaning assemblies in which the wiper has a large axial dimension, substantially of the order of the largest dimension of the glazed surface to be cleaned. For example, such an embodiment may be implemented to ensure that the glazed surface is wiped perpendicularly to a longest dimension of said glazed surface. In other words, the wiper extends over the longest dimension of the glazed surface, thus advantageously reducing the travel time of the cleaning system on the glazed surface and therefore the time required to clean said glazed surface.

Advantageously, when the cleaning system according to the present invention has such an alternative, it preferably has the guide means at each of its longitudinal ends.

According to one feature of the invention, irrespective of the embodiment implemented, the wiper may comprise at least one supply device for supplying cleaning fluid and at least one spray device for spraying said cleaning fluid onto at least the glazed surface of the sensor/transmitter.

By way of example, the supply device may consist of at least one tube while the device for spraying the cleaning fluid may consist of at least one duct formed in the blade holder and a plurality of nozzles opening into said duct. The cleaning fluid is thus brought into the cleaning system by the supply device, it then flows through the duct of the spray device before being sprayed through the nozzles, toward the glazed surface to be cleaned.

According to one feature of the invention, the conversion device may comprise at least one control member for controlling the supply device and the device for spraying the cleaning fluid.

The control member may consist of a contactor and an on-off switch for, when the control device is actuated a first time, supplying the cleaning system with cleaning fluid, and, when the control member is actuated a second time, cutting off the flow, and therefore the spray, of cleaning fluid.

By way of example, when the conversion device is produced according to one of the alternatives of the first embodiment, the control member may be carried by one of the connecting rods of the connecting rod system and the control member may be actuated by an adjacent connecting rod, for example articulated on this same connecting rod.

Alternatively, when the conversion device is produced according to one of the alternatives of the second embodiment, the control member may be carried by the connector and the cam may comprise at least one activation member, for example a finger, extending from said cam and configured to actuate the control member.

The invention also relates to a detection assembly for a motor vehicle comprising at least the sensor/transmitter, comprising at least the glazed surface, and at least the cleaning system as described above.

According to one feature of the invention, a main dimension of a blade of the wiper is substantially equal to one of the dimensions, longitudinal or transverse, of the glazed surface to be cleaned.

In particular, the blade holder of the wiper may have a main dimension substantially greater than the longitudinal dimension of the blade.

Alternatively, the blade of the wiper may have a length substantially less than the longitudinal or transverse dimension of the glazed surface. In this way, the wiping performed by the wiper may be limited to the field of vision of the sensor/transmitter, i.e. to a functional portion of the glazed surface.

According to the invention, the glazed surface may be curved, the glazed surface being defined by at least a directrix and a generatrix, the axis of translation of the wiper extending parallel to at least the generatrix of the glazed surface of the sensor/transmitter.

In other words, the wiper, substantially perpendicular to the axis of translation, extends perpendicular to at least the generatrix of the glazed surface.

The term "curved" means that the glazed surface constitutes a portion of a cylinder defined by the directrix and the generatrix.

Advantageously, the wiper may have a curvature configured to match the curve of the glazed surface.

According to one feature of the invention, when the sensor/transmitter comprises a curved glazed surface, the cleaning system may be configured so that it is arranged such that the conversion device is essentially included in a main plane perpendicular or parallel to the generatrix helping to define the glazed surface.

According to one feature of the invention, when the sensor/transmitter comprises a flat glazed surface, the main plane comprising the conversion device may extend parallel or perpendicular to the plane of extension of the glazed surface.

In other words, the conversion device may extend perpendicular to at least one of the walls of the sensor/transmitter housing, in particular a side wall, an upper wall or a lower portion.

According to one feature of the invention, the housing may comprise at least one opening configured to allow the drive device of the wiper system, i.e. the conversion device or the drive motor or a connecting member connecting them to one another, to pass through. By way of example, the opening may be made in one of the side walls, in the lower portion or in the upper wall of said housing, the opening being configured to accommodate the movement of the drive device between the first end position and the second end position.

BRIEF DESCRIPTION OF THE DRAWINGS

Other features, details and advantages of the invention will become more clearly apparent upon reading the description set out below for information purposes, with reference to the drawings, in which.

DETAILED DESCRIPTION OF THE INVENTION

It should firstly be noted that the figures disclose the invention in detail for the purpose of implementing the invention, and it will be appreciated that said figures can be used to define the invention more clearly where applicable.

In the rest of the description, the term "longitudinal", represented by the reference Ox, refers to the orientation of a longest dimension of the glazed surface to be cleaned of the detection assembly according to the invention, included between two side edges, while the term "transverse", represented by the reference Oy, refers to a direction perpendicular to the longitudinal direction, extending between an upper edge and a lower edge of said glazed surface.

Figure 1:
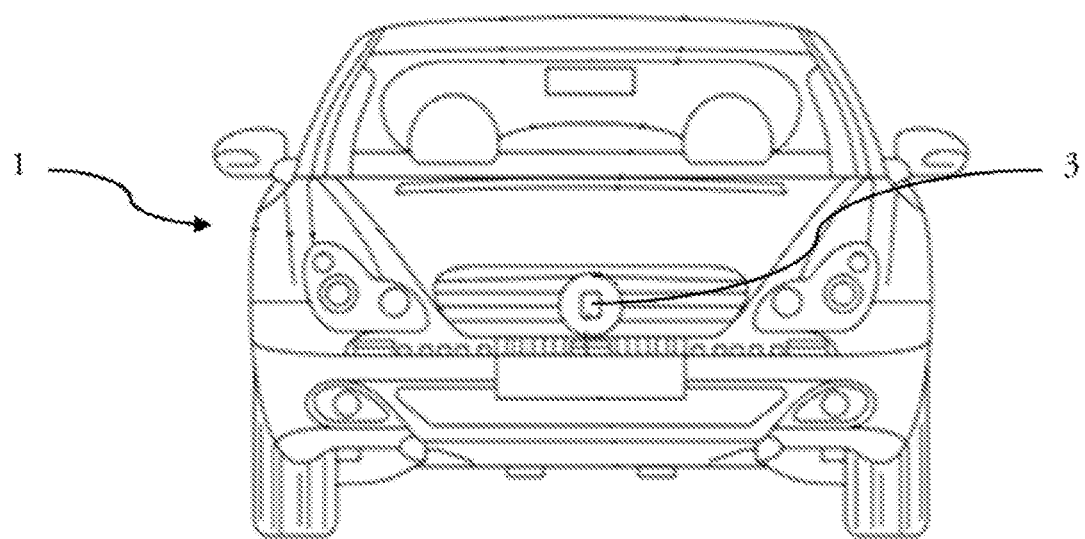
FIG. 1 is a front view of a motor vehicle comprising a detection assembly according to the invention.

FIG. 1 shows a motor vehicle 1 comprising a detection assembly 3, which is in this case arranged in a grille of the vehicle, but which could, without departing from the context of the invention, be arranged on the front, rear and/or side face of this motor vehicle 1.

Figure 2:
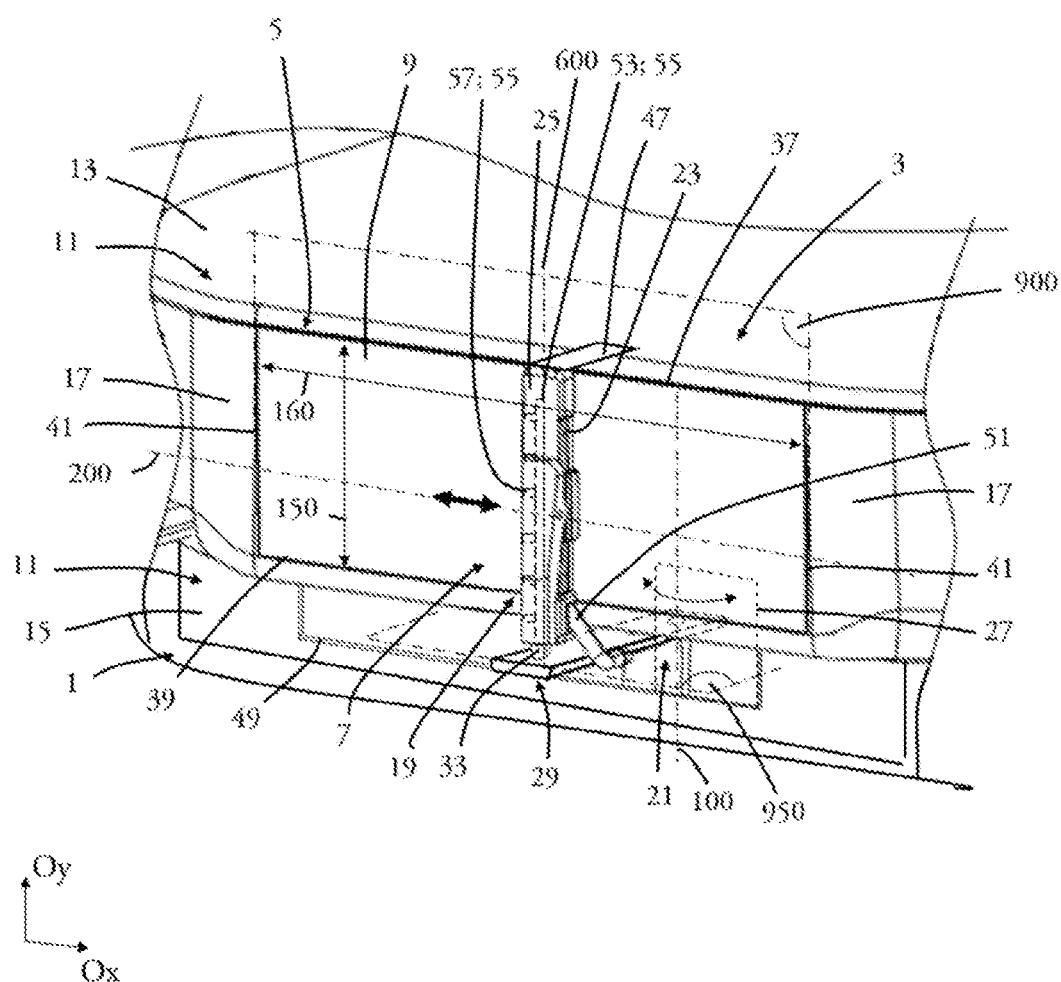
FIG. 2 is a schematic perspective view of the detection assembly in which a cleaning system extends perpendicularly to the longitudinal direction.

The detection assembly 3 is shown more particularly in FIG. 2.

The detection assembly 3 comprises at least one sensor/transmitter 5 and a cleaning system 7, configured to wipe a glazed surface 9 of said sensor/transmitter 5. The term "sensor/transmitter 5" means a member configured to acquire data relating to surroundings external to the motor vehicle 1 and to transmit the data thus acquired to a control unit, and any type of detection may be used in this context.

By way of example, the sensor/transmitter 5 shown may be a RADAR (RAdio Detection And Ranging) system, emitting radio waves, or a LIDAR (LIght Detection And Ranging) system, emitting light waves, for example a laser beam.

The control unit is configured to send, as a result of this information received from the sensor/transmitter 5, one or more instructions for initiating or assisting a maneuver of the motor vehicle.

Below, the sensor/transmitter having a glazed surface to be cleaned will be described as an optical sensor, the optical surface of which is to be cleaned by the wiping system according to the invention. It is understood that this is not limiting and that the invention encompasses any type of sensor/transmitter, for example a sensor capable of emitting and receiving light or electromagnetic waves.

The optical sensor 5 comprises a housing 11 carrying the optical surface 9, the optical surface 9 being held in place by at least two walls of the housing 11. In the example shown, the optical surface 9 extends between an upper wall 13, a lower portion 15 and two side walls 17 of the housing 11, the optical surface 9 facing the roadway.

Figure 3:
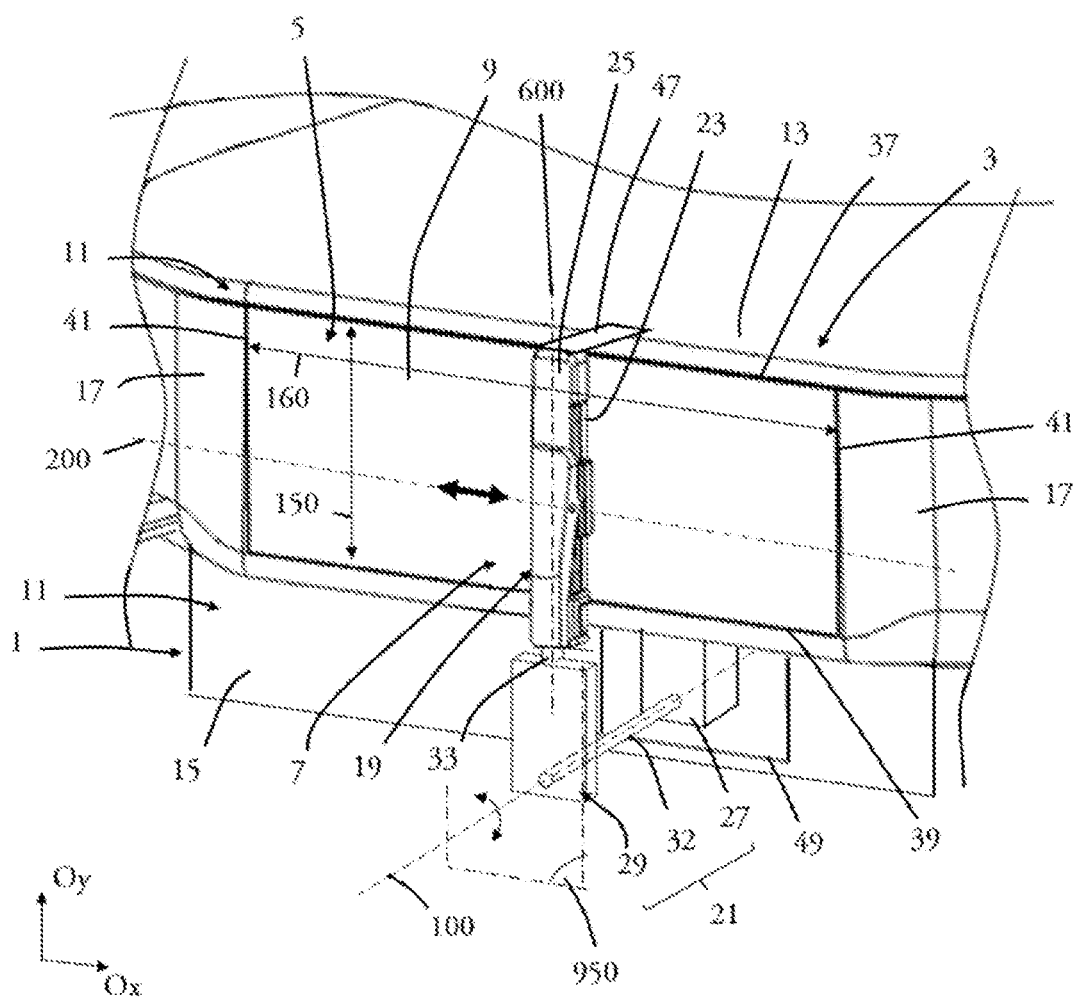
FIG. 3 is a schematic perspective view of an alternative arrangement of the detection assembly in which the cleaning system extends perpendicularly to the longitudinal direction.

Notably, as shown in FIG. 2 or 3 for example, the glazed surface associated with the cleaning system according to the invention has an elongate shape, i.e. with a main elongation dimension, here corresponding to a longitudinal direction, parallel to the direction of movement of the wiper of the cleaning system along the glazed surface. By way of non-limiting example, the longitudinal main elongation dimension, or longitudinal dimension, of the glazed surface is at least equal to twice the transverse dimension, or height, of this glazed surface. For example, the longitudinal dimension may be about 300 mm and the height may be about 100 mm.

The optical surface 9 may be flat, as shown, this surface then being essentially included in a plane of extension 900.

According to the invention and as explained below, the optical surface 9 may also be curved around a longitudinal axis, i.e. an axis parallel to the largest dimension of the optical surface and the direction of translational movement of the cleaning system. Advantageously, the wiper may be substantially curved so as to ensure optimum wiping of the optical surface 9.

The optical sensor 5 must be able to operate optimally in all circumstances. In order to optimize the acquisition of images by the optical sensor 5, it is necessary to prevent the accumulation of particles and dirt on the optical surface 9. To this end, the cleaning system 7 of the detection assembly 3 is configured to wipe at least a portion of the optical surface 9, for example its field of vision, or even the whole of said optical surface 9.

The cleaning system 7 comprises at least one wiper 19 mounted movably relative to the optical surface 9 and a drive device 21.

The wiper 19 comprises a blade 23, effectively pressed against the optical surface 9 in order to wipe same, and a blade holder 25, carrying said blade 23.

The drive device 21 is composed of a rotary drive motor 27, shown schematically in FIG. 2 by dotted lines, and configured to drive an output shaft 32 about an axis of rotation 100, and a conversion device 29 for converting the rotary movement of the drive motor 27 into a rectilinear movement along the main axis of elongation of the glazed surface, in this case the longitudinal direction. Said rotary movement may be a continuous or discontinuous rotary movement.

The conversion device 29 comprises an articulated connecting member 31 to which the wiper 19 is attached and this conversion device 29 is connected to the output shaft 32, at a fixed motor articulation point 35. The expression "fixed motor articulation point" means a connection point through which the movement of the motor is transmitted to the conversion device and the position of which in space, in particular with respect to the arrangement of the glazed surface, remains substantially identical throughout the movement of the conversion device 29.

As will be described in more detail below, the conversion device 29, interposed between the wiper 19 and the drive motor 27, is configured such that the wiper is driven, under the effect of the rotation of the drive motor 27, in a rectilinear movement along an axis of translation 200, between the first end position and the second end position with respect to the optical surface 9.

The conversion device 29, in this case shown schematically in the form of a parallelogram, may consist of a connecting rod system and/or at least one cam, various embodiments and arrangements of said conversion device 29 being explained in more detail below.

In FIGS. 2 and 3, the optical surface 9 is flat and the wiper 19 has a substantially rectilinear structure. The wiper 19 extends parallel to the plane of extension 900, the blade 23 of the wiper 19 being in contact with the optical surface 9 so as to be able to scrape same during the movement of the cleaning system 7.

The wiper 19 extends in a direction defined by a line of extension 600, perpendicular to the axis of translation 200. The wiper may be arranged such that the line of extension extends parallel to the transverse direction Oy and to a shortest dimension of the optical surface 9, between an upper edge 37 and a lower edge 39 of the optical surface 9.

Alternatively, and as will be explained in more detail below, the wiper 19 may be mounted such that the line of extension 600 extends parallel to said upper edge 37 or lower edge 39, i.e. parallel to the longitudinal direction Ox or to the longest dimension of the optical surface 9.

The arrangement of the wiper 19 relative to the optical surface 9 may in particular depend on the structure of said optical surface 9. To be specific, for a flat optical surface, the wiper may be arranged parallel to the longitudinal direction Ox or to the transverse direction Oy. On the other hand, when the optical surface 9 is curved, the orientation of the wiper 19 will depend on the orientation of the curve of the optical surface 9, as will be explained in detail below.

It follows from such arrangements that, depending on the embodiment implemented, either the wiper 19 may perform a rectilinear movement over a transverse dimension 150 of the optical surface 9, between the upper edge 37 and the lower edge 39, such that the axis of translation 200 extends parallel to the transverse direction, as in FIG. 2, or the wiper may move over a longitudinal dimension 160 of the optical surface 9, consisting of the longest dimension of the optical surface 9 between two side edges 41, parallel to the longitudinal direction, as in FIG. 3. It is understood that the wiper 19 is capable of moving in two opposite directions along the axis of translation 200.

In the example shown, the wiper 19 is connected to the drive device 21, and more particularly to the articulated connecting member 31, by a connector 33, which is attached to a first axial end 43 of the wiper 19 while a second axial end 45, opposite the first axial end 43, comprises a guide member 47.

The guide member 47 in this case has the shape of a tongue or a tab which extends toward the optical surface 9 in order to ensure that, during the rectilinear movement of the wiper 19 along the axis of translation 200, the wiper 19 remains substantially perpendicular to said axis of translation 200. Advantageously, the wiper 19 may comprise a plurality of guide members 47, respectively equipped on the first axial end 43 and the second axial end 45.

FIG. 2 more particularly shows a first embodiment of the cleaning system 7 in which the conversion device 29 is essentially included in a main plane 950 perpendicular to the transverse arrangement of the wiper 19. The conversion device 29 extends partially inside the housing 11 and partially outside the optical sensor 5.

Thus, in order to allow movement of the conversion device 29 between the first end position of the cleaning system and the second end position, the housing 11, in this case its lower portion 15, comprises an opening 49 through which the conversion device 29 extends.

Alternatively, the arrangement of the cleaning system 7 with respect to the sensor may be reversed so that the conversion device 29 extends facing the upper wall 13, the latter comprising the opening 49.

According to another alternative, and as explained below, the cleaning system may be arranged so that the conversion device 29 is placed facing one of the side edges 41 of the optical surface 9. In such an optical system, the opening 49 will be made in the corresponding side wall 17 of the housing 11.

Additionally, according to the example shown in FIG. 2, the cleaning system 7 may be configured to spray a cleaning fluid onto the optical surface 9. To this end, the cleaning system 7 may comprise at least one supply device 51 for supplying the wiper 19 with cleaning fluid, for example at least one tube, together with at least one device 53 for spraying the cleaning fluid, carried on board the wiper and ensuring the spraying of the cleaning fluid onto the optical surface 9.

For example, the spray device 53 may comprise at least one duct 55, formed along the wiper in the blade holder 25 and fluidly connected to the supply device 51 of the cleaning system 7, and at least one nozzle 57 carried by the blade holder, facing the optical surface 9 and emerging in said duct 55. Advantageously, a plurality of nozzles 57 may be distributed along the blade holder 25. The cleaning fluid is thus, according to the example shown, injected into the supply device 51 and then flows in the duct 55 of the spray device 53 before being sprayed toward the optical surface 9 by passing through the nozzles 57.

FIG. 3 more particularly shows a second embodiment of the cleaning system 7, substantially identical to that described above but in which the conversion device 29 extends essentially in a main plane 950 substantially parallel to the line of extension 600 of the wiper 19 and to the transverse direction Oy, corresponding here to the shortest dimension of the optical surface 9.

In such an optical assembly 3, the lower portion 15 of the housing also includes an opening 49, configured to allow the drive motor 27 to pass through. Said opening 49 in this case has smaller dimensions than that shown in FIG. 2 since it is configured to allow only the output shaft 32 of the drive motor to pass through, this shaft being connected to the conversion device 29, transmitting a rotary movement around the axis of rotation 100 to the conversion device 29, such a movement not involving a change in position of the drive motor 27 in the longitudinal Ox and/or transverse Oy directions.

As explained above, the arrangement of the cleaning system 7 with respect to the optical sensor may be modified so that the conversion device 29 extends facing the upper wall 13, the latter comprising the opening 49, or facing of one of the side walls 17 of the housing 11.

Note that, while FIGS. 2 and 3 show optical assemblies in which the optical sensor 5 comprises a flat optical surface 9, the features relating to the present invention set out above may also be applied to a curved optical surface 9, the specifics relating to the arrangement of the wiper with respect to said curved optical surface being explained in more detail below.

FIGS. 4 to 10 show various embodiments and alternatives of the conversion device 29. For the sake of clarity, the conversion devices 29 shown are arranged such that the main plane 950 in which they lie extends substantially parallel to the surface to be cleaned, and therefore to the transverse direction and to the longitudinal direction as described for FIG. 3. It is nevertheless understood that, for all of the embodiments described below, the conversion device 29 may be arranged such that the main plane 950 in which it lies extends perpendicularly to the glazed surface, as described above for FIG. 2.

Also, in all of the figures below, the optical surface 9 has a curved structure, the curvature of which is schematically defined by a directrix 110, extended by dotted lines. Such figures are in no way limiting and are intended to clarify the relative arrangement of the wiper 19 with respect to the curve and the generatrices 120 of said curved optical surfaces. The optical assembly 3 may nevertheless, as explained above, comprise a flat optical surface 9 without changing the arrangement of the optical assembly 3.

Figure 4:
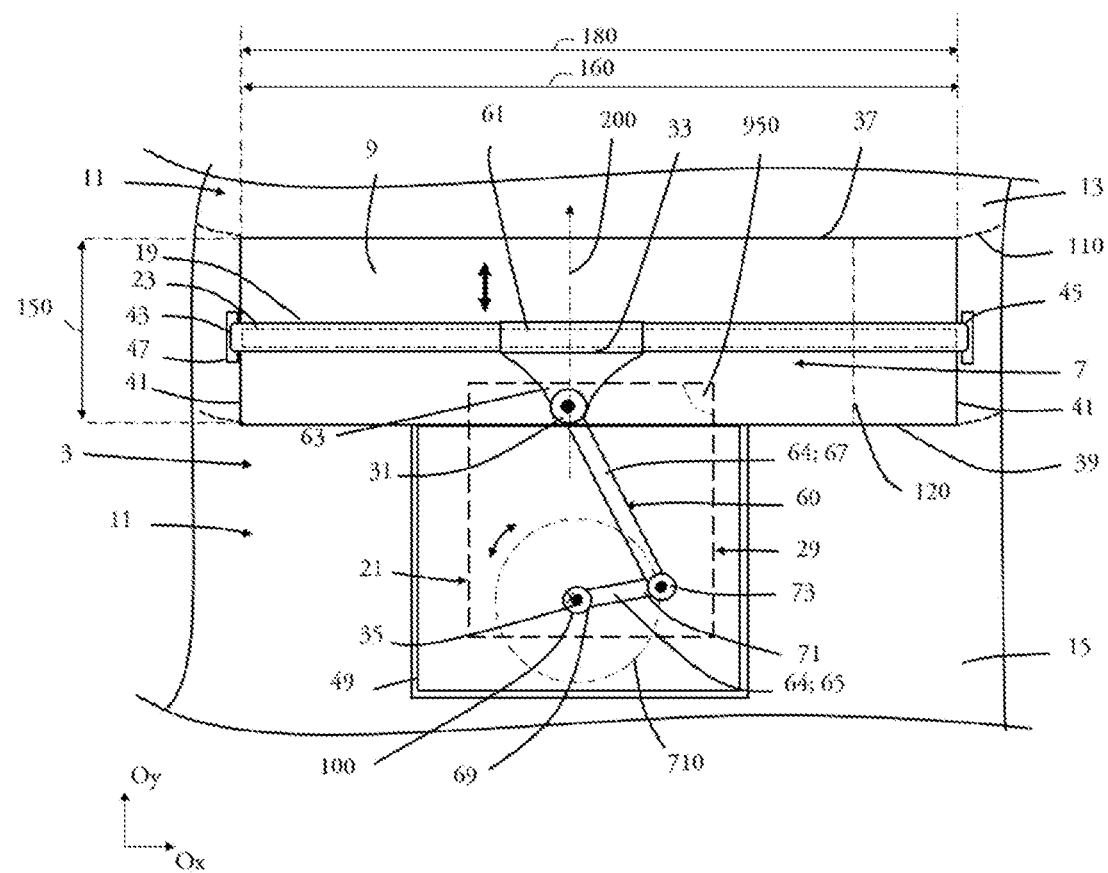
FIG. 4 schematically depicts the cleaning system according to a first embodiment, comprising a device for converting a rotary movement into a rectilinear movement, consisting of a connecting rod system.

FIGS. 4 to 9 show various examples of a first embodiment in which the conversion device 29 comprises a connecting rod system 60. FIG. 4 shows an example of a simple architecture of the connecting rod system 60 while FIGS. 5 to 9 show various embodiments of the cleaning system 7 where the latter comprises a connecting rod system 60 such as a Peaucellier-Lipkin device.

The optical assembly 3 shown in FIG. 4 has a curved optical surface 9 the surface shape of which is defined by a directrix 110 curved around a transverse axis and a generatrix 120 extending perpendicularly to this directrix while being substantially parallel to the transverse direction Oy.

Within the cleaning system 7, the wiper 19 is arranged so as to extend perpendicularly to the generatrix 120 of the optical surface 9, the wiper 19 being moved along a rectilinear path along the axis of translation 200, substantially parallel to said generatrix 120. Note that such a relative arrangement of the wiper 19 and the generatrix of the optical surface 9 is reproduced for the various embodiments of the present invention implementing a curved optical surface.

The blade 23 of the wiper 19, shown here schematically in dotted lines, is characterized by a length 180, measured along the line of extension 600 of the wiper 19, and substantially equal to the longitudinal dimension 160 of the optical surface 9, measured between its two side edges 41.

Alternatively, the blade 23 of the wiper may have a length 180 less than the longitudinal dimension 160 of the optical surface 9, so as to limit wiping to a portion of said optical surface 9.

In the example shown, the wiper 19 is connected to the conversion device 29 by the connector 33, which is centered on the blade holder 25. In other words, the connector 33 is equidistant from the first axial end 43 and the second axial end 45 of the wiper 19. Note that the connector 33 is shown here schematically and illustrates an embodiment of said connector 33, its structure not being in any way limiting. The connector 33 comprises at least one attachment member 61 for attaching the connector 33 to the blade holder 25, for example a plurality of claws or a clipping member, and at least one connection means 63 for connecting the connector 33 to at least one connecting rod 64 of the connecting rod system 60, the connection means 63, consisting for example of a hole or a pivot system, forming part of the articulated connecting member 31 of the cleaning system.

The wiper 19 shown in FIG. 4 comprises two guide members 47 extending on either side of the optical surface 9, facing the side edges 41. The guide members 47 are intended to ensure the stability of the wiper 19 and the linearity of its movement in translation between the first end position and the second end position along the axis of translation 200 so that the wiper 19 stays substantially perpendicular to the generatrix 120 of the optical surface 9. The guide members may in particular consist of a slider housed in a rail suitably formed on the housing at the side edges 41.

Alternatively, it could nevertheless be envisaged arranging the connector 33 at one end of the wiper 19, as illustrated below for other embodiments, and providing a single guide member 47 at the opposite end of the wiper 19.

The movement of the wiper 19 is ensured by the drive device 21 comprising the conversion device 29, in this case the connecting rod system 60, and the drive motor, not shown. In particular, and as explained above, the connection between said drive motor and the conversion device 29 is formed at the opening 49 made in the lower portion 15 of the housing 11.

In this case, the connecting rod system 60 comprises two connecting rods 64, referred to as the first connecting rod 65 and second connecting rod 67. The conversion device 29 is in this case essentially included in the main plane 950, which extends parallel to the axis of translation 200 and to the generatrix 120 of the optical surface 9 as well as perpendicular to the axis of rotation 100 of the drive motor 27.

The first connecting rod 65 is connected to the output shaft of the drive motor, a first tip 69 of the first connecting rod 65 forming the fixed motor articulation point 35. The expression "fixed motor articulation point 35" means that the first tip 69 of the first connecting rod 65 is arranged in the axial extension of the output shaft of the drive motor and is therefore not moved in space along the longitudinal Ox and/or transverse Oy directions.

The first connecting rod 65 is thus rotated around the axis of rotation 100 and it has a second tip 71, opposite to the first tip 69, which is thus moved in an arcuate path along the first circle 710, centered on the axis of rotation 100, when the drive motor 27 is operating.

The second connecting rod 67 is articulated to the first connecting rod 65, the first connecting rod 65 and the second connecting rod 67 being connected at a first pivot 73. The second connecting rod 67 is also connected to the connector 33 so as to carry the wiper 19, the connection between said connector 33 and the second connecting rod 67 forming the articulated connecting member 31 of the cleaning system.

Thus, when the drive motor is activated, the first connecting rod 65 is rotated, the second tip 71 of the first connecting rod 65, and therefore the first pivot 73, thus moving along the first circle 710. This results in a movement of the second connecting rod 67 and, with the wiper guided in translation by the guide members 47, this movement generates a push or a pull on the connector and therefore a movement of the wiper along a rectilinear path along the axis of translation 200, between the first end position and the second end position, parallel to the generatrix 120 of the optical surface 9.

The dimensions of the connecting rods impact on the transverse stroke of the wiper and these dimensions are provided such that the end positions of the wiper may correspond to the regions close to the upper edge 37 and the lower edge 39 of the optical surface 9, so that the wiper 19 moves over the entire transverse dimension 150 of the optical surface 9.

Alternatively, the cleaning system 7 may be configured, in particular by a specific dimensioning of the connecting rods or by abutment means blocking the rotation of the first connecting rod 65, to wipe a limited portion of the transverse dimension 150 of the optical surface 9, the spacing between the first end position and the second end position as well as the extent of movement of the wiper 19 thus being smaller.

Such a connecting rod system 60 has the advantage of simple, compact and inexpensive implementation. The embodiments presented below implement a connecting rod system 60 of the Peaucellier-Lipkin device type, which is more complex, advantageously conferring greater stability on the conversion device 29 and therefore optimized linearity of the rectilinear movement of the wiper 19 along the axis of translation 200.

In particular, the examples of implementation of the present invention set out below show the relative arrangement of the optical surface 9 and the wiping system 7, without the housing of the optical sensor. It is nevertheless understood that the features described above in relation to said housing, such as the presence of the opening allowing the mechanical connection between the drive motor and the conversion device, also apply to the various alternatives set out below.

In general, the conversion device 29 as shown in FIGS. 5 to 9 comprises a connecting rod system 60 with a plurality of connecting rods 64, essentially included in the main plane 950, substantially parallel to the generatrix 120 of the optical surface and to the transverse direction Oy.

One of the connecting rods 64 of the connecting rod system 60, referred to as the first connecting rod 65, has features similar to those described above, i.e. said first connecting rod 65 is attached to and pivotally mounted on the drive motor 27 so as to form the fixed motor articulation point 35, the first tip 69 of the first connecting rod 65 being in the extension of the output shaft and the axis of rotation 100, substantially perpendicular to the generatrix 120 of the optical surface 9, such that the second tip 71 of the first connecting rod 65 is moved along the first circle 710 centered on the axis of rotation 100.

The connecting rod system 60 further comprises at least two articulated quadrilaterals, respectively a first quadrilateral 75 and a second quadrilateral 77 of connecting rods 64, at least the articulated connecting member 31 being formed jointly by the first quadrilateral 75 and the second quadrilateral 77.

The first quadrilateral 75 is a diamond formed by the second connecting rod 67, a third connecting rod 79, a fourth connecting rod 81 and a fifth connecting rod 83, all of identical dimensions. The second connecting rod 67 and the third connecting rod 79 are articulated to the second tip 71 of the first connecting rod 65, so as to form the first pivot 73 mentioned above. Likewise, the second connecting rod 67 and the fourth connecting rod 81 are connected so as to form a second pivot 85 while the third connecting rod 79 and the fifth connecting rod 83 are connected so as to form a third pivot 87.

The fourth connecting rod 81 and the fifth connecting rod 83 are connected to the connector 33 to form the articulated connecting member 31 connecting the conversion device 29 to the wiper 19. The first quadrilateral 75 of connecting rods 64 thus extends between the first connecting rod 65, at the first pivot 73, and the wiper, at the articulated connecting member 31.

The second quadrilateral 77 of connecting rods 64 comprises a sixth connecting rod 89 and a seventh connecting rod 91, as well as the fourth connecting rod 81 and the fifth connecting rod 83 described above. In other words, the fourth connecting rod 81 and the fifth connecting rod 83 are common to the first quadrilateral 75 and to the second quadrilateral 77 of the connecting rod system 60. The same goes for the articulated connecting member 31 connecting the fourth connecting rod 81 and the fifth connecting rod 83. The sixth connecting rod 89 is connected to the fourth connecting rod 81 at the second pivot 85 and the seventh connecting rod 91 is connected to the fifth connecting rod 83 at the third pivot 87.

In particular, the sixth connecting rod 89 and the seventh connecting rod 91 have substantially identical dimensions which are greater than the dimensions of the fourth connecting rod 81 and the fifth connecting rod 83, while the connecting rods of the first quadrilateral 75 all have an identical dimension in this case.

The sixth connecting rod 89 and the seventh connecting rod 91 are pivotally mounted around a common fixed point 93 of the conversion device 29. In other words, a first end 891 of the sixth connecting rod and a first end 911 of the seventh connecting rod are pivotally mounted around a pivot axis 300 substantially parallel to the axis of rotation 100 of the drive motor 27 and substantially perpendicular to the longitudinal direction Ox and to the transverse direction Oy, said ends not being moved in space relative to the longitudinal Ox and transverse Oy directions. Opposite ends, respectively a second end 892 of the sixth connecting rod and a second end 912 of the seventh connecting rod each corresponding to the second pivot 85 and the third pivot 87, are driven along an arcuate path defined by a second circle 895 centered on the pivot axis 300.

Note that the fixed point 93 is arranged on the first circle 710 defining the path of the second tip 71 of the first connecting rod 65. Moreover, the second quadrilateral 77 of connecting rods 64 is not directly connected to the first connecting rod 65.

Figure 5:
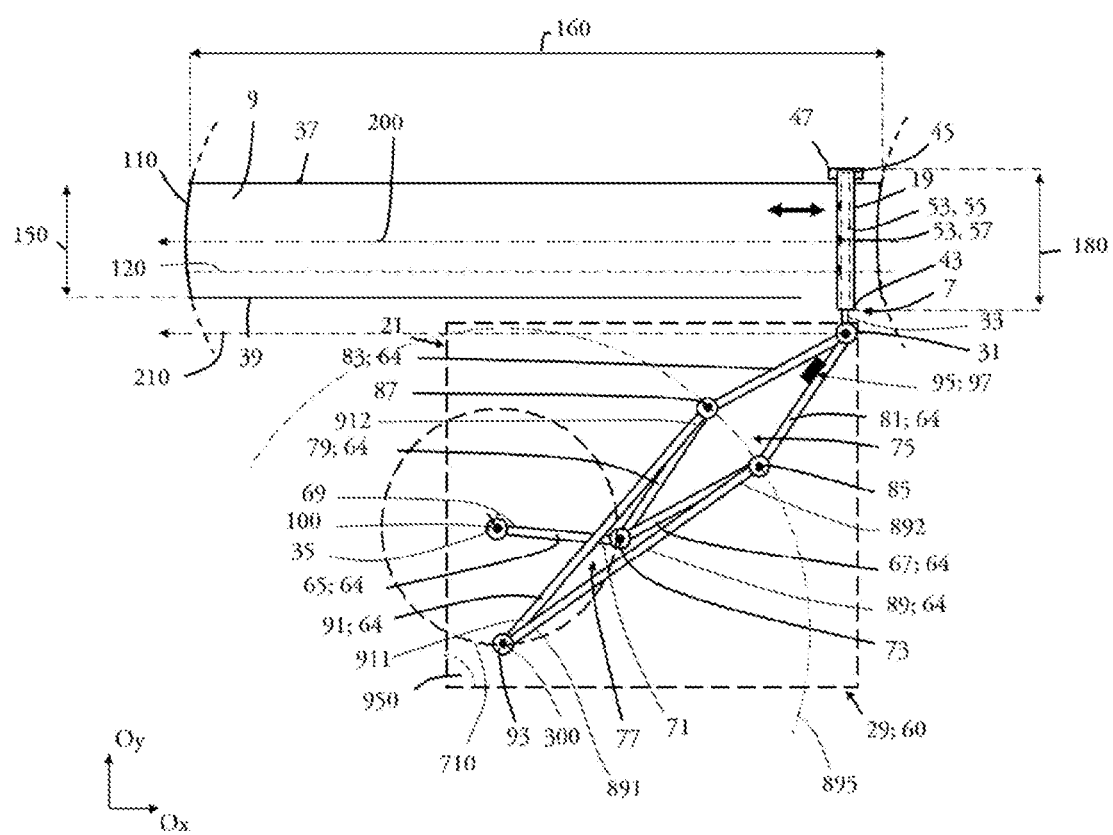
FIG. 5 schematically depicts the cleaning system according to an alternative of the first embodiment, in which the conversion device is a connecting rod system consisting of a Peaucellier-Lipkin device shown in a first end position.
Figure 6:
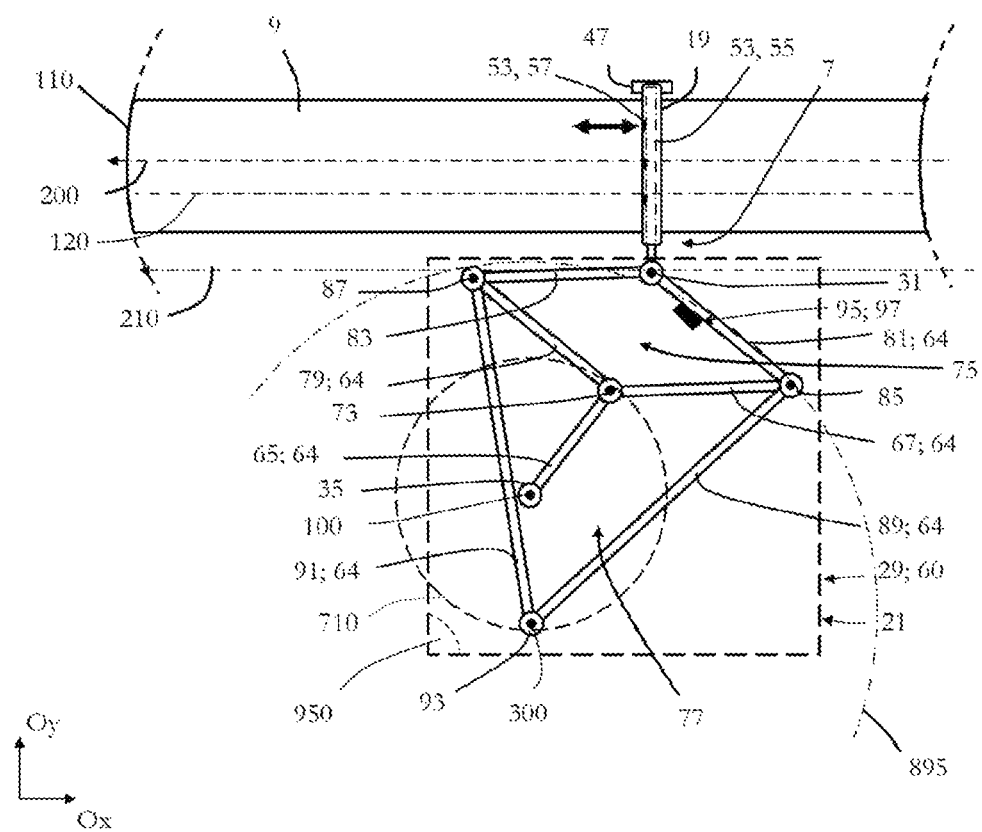
FIG. 6 schematically depicts the cleaning system shown in FIG. 5, with the conversion device in an intermediate position.
Figure 7:
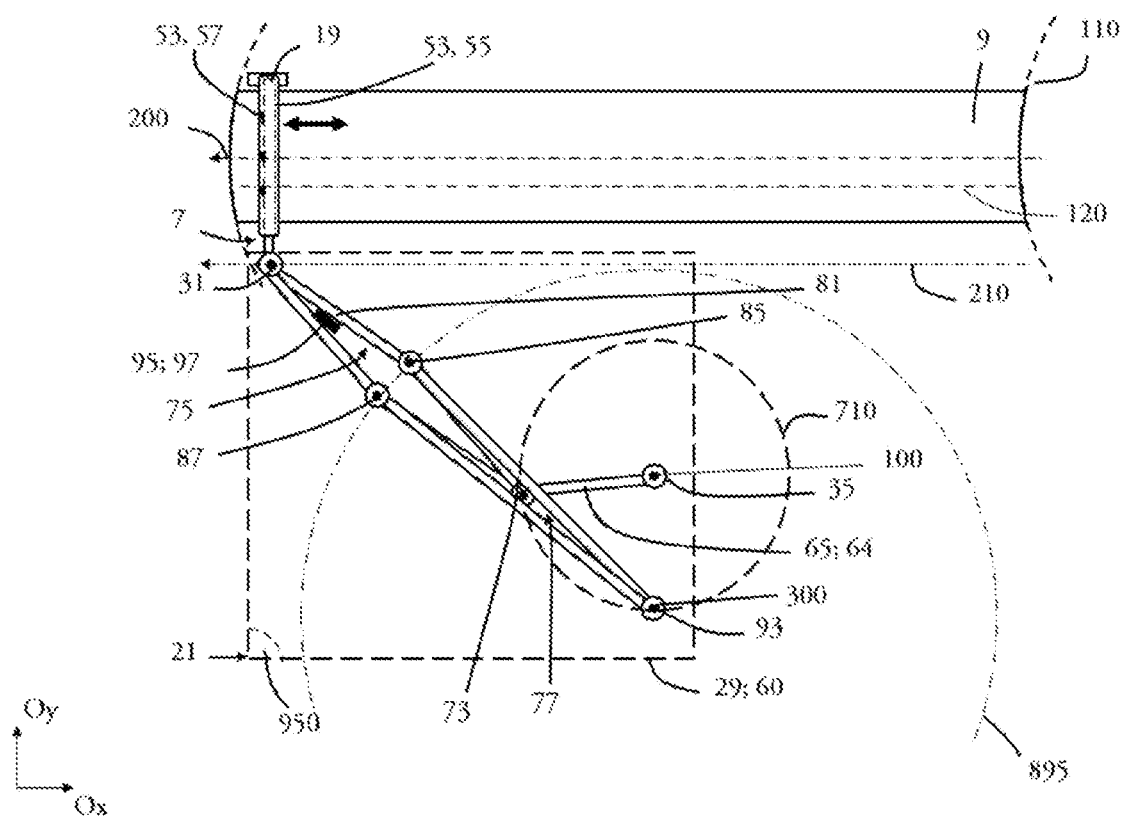
FIG. 7 schematically depicts the cleaning system shown in FIGS. 5 and 6, with the conversion device in a second end position, opposite the first end position shown in FIG. 5.

FIGS. 5 to 7 show in detail, for a first embodiment, the movement of the wiper 19 between the first end position, visible in FIG. 5, and the second end position, visible in FIG. 7, in which the wiper is arranged substantially in the vicinity of the side edges 41 of the optical surface 9. In this embodiment, the wiper 19 is thus moved over the longitudinal dimension 160 of the optical surface 9 and the conversion device 29 is arranged facing the lower edge 39 of the optical surface 9. Alternatively, it could be arranged facing the upper edge 37.

When the drive motor 27 is in operation, the second tip 71 of the first connecting rod 65 along with the first pivot 73 of the first quadrilateral 75 of connecting rods 64 are driven along the arcuate path, on the first circle 710. This movement of the first connecting rod 65 tends to move the second pivot 85 and the third pivot 87, connected to the first pivot 73 respectively via the second connecting rod 67 and the third connecting rod 79. As stated above, these second and third pivots are caused to move along the second circle 895 owing to the connection between these pivots and the common fixed point 93 shared by the sixth connecting rod 89 and the seventh connecting rod 91, which are themselves also driven by the movement of the second and third pivots.

Such a connecting rod system 60, combined with the guiding in translation of the wiper on either side, or at least along one side, of the glazed surface, makes it possible to ensure the conversion of the circular path defined by the first circle 710 into a linear path of the articulated connecting member 31 along a primary axis 210, parallel to the axis of translation of the wiper 19, this wiper being carried by the articulated connecting member 31 via the connector 33 which may take the form of a rigid arm.

The movement of the wiper 19 between the first end position and the second end position is characterized by the gradual deformation of the first quadrilateral 75 and the second quadrilateral 77 of connecting rods 64.

For example, when the wiper 19 is moved from the first end position, as shown in FIG. 5, to any intermediate position, an example of which is shown in FIG. 6, between the first end position and the second end position, the first quadrilateral 75 and the second quadrilateral 77 change shape insofar as the second pivot 85 and the third pivot 87 move apart gradually. The result, for the first quadrilateral 75, is that the articulated connecting member 31 and the first pivot 73 move closer together and, for the second quadrilateral 77, is that this articulated connecting member 31 and the fixed point 93 move closer together.

When the wiper 19 is moved from the intermediate position in FIG. 6 to the second end position, as shown in FIG. 7, the articulated connecting member 31 and the first pivot 73 will gradually continue to move closer together, until the fixed point 93, the fixed motor articulation point 35, the first pivot 73 and the articulated connecting member 31 are aligned, before moving apart again until the wiper reaches this second end position. The drive motor 27 is then actuated in reverse so that the connecting rod system is moved in reverse to the previous movement to return to the first end position.

Advantageously, when the wiping system is configured to spray a cleaning fluid onto the optical surface 9, comprising at least the duct 55, shown schematically in dotted lines, and the plurality of nozzles 57 forming the spray device 53, the conversion device 29 may be equipped with a control member 95 for controlling said supply and spray 53 devices regulating the flow and spraying of the cleaning fluid.

The control member 95 may in particular comprise a contactor 97 connected to a cleaning fluid supply control valve. By way of example, the contactor 97 may be carried by the fourth connecting rod 81 so that, when the second pivot 85 and the third pivot 87 are brought together at the first end position, the fifth connecting rod 83 comes into contact with the contactor 97 carried by the fourth connecting rod 81, allowing electrical contact and sending an instruction for the abovementioned valve to open, so as to allow the cleaning fluid to flow. The cleaning fluid is then distributed in the cleaning system 7 and sprayed toward the optical surface 9 throughout the movement of the wiper 19, from the first end position to the second end position.

When the second pivot 85 and the third pivot 87 are brought together again, with the wiper in the second end position, the fifth connecting rod 83 again comes into contact with the contactor 97, allowing electrical contact and sending an instruction for the abovementioned valve to close, so as to cut off the flow of cleaning fluid. Consequently, no fluid is sprayed onto the optical surface 9 as the wiper 19 moves from the second end position to the first end position.

In such a situation, the cleaning fluid spray nozzles 57 are turned toward the second end position, so that the optical surface 9 is first moistened by the cleaning fluid and then wiped by the blade 23 of the wiper 19. Provision could be made, without departing from the context of the invention, for the orientation of the nozzles, and the end position in which the opening or closing of the valve is triggered, to be modified.

Another alternative could consist in modifying the location of the contactor 97, for example between the second connecting rod 67 and the third connecting rod 79, or between the sixth connecting rod 89 and the seventh connecting rod 91.

Figure 8:
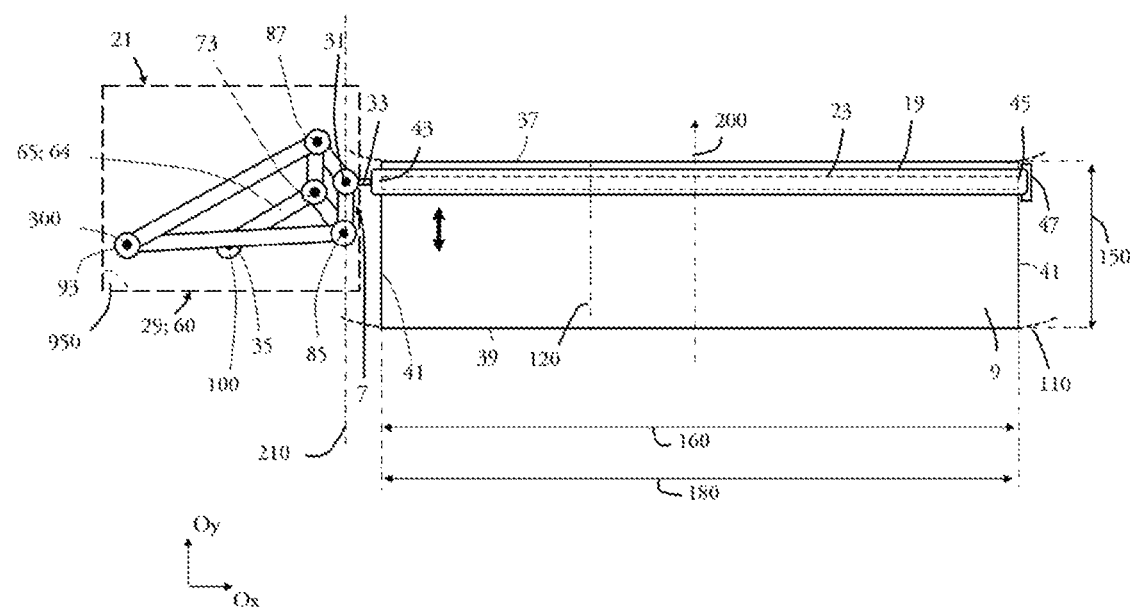
FIG. 8 schematically depicts the cleaning system produced according to an alternative of the first embodiment as shown in FIGS. 4 to 7.

FIG. 8 shows an alternative example of the first embodiment advantageously making it possible to reduce the extent of movement of the wiper 19 and therefore the duration of the sensor surface cleaning operation, as well as making it possible to make the connecting rod system 60 compact. In such a cleaning system 7, the wiper 19 extends parallel to the longitudinal dimension 160 of the optical surface 9, i.e. between the side edges 41, and the wiper 19 is moved translationally in the transverse direction between the first end position and the second end position, respectively positioned near the upper edge 37 and the lower edge 39 of the optical surface 9.

Note that, as explained above, such an embodiment of the present invention can only be implemented if the wiper 19 moves along the axis of translation 200, parallel to the generatrix 120 of the optical surface 9. The optical surface 9 shown in FIG. 8 thus has a curvature having a different orientation from that previously described in FIGS. 4 to 7, the curvature being positioned around a transverse axis. In other words, while the position of the drive device 21, and in particular the position of the conversion device 29, can be modified, it is essential, for optimal operation of the present invention, that the wiper 19 extend perpendicular to the generatrix 120 and that it be moved along the axis of translation 200, with a movement substantially parallel to said generatrix 120. On the other hand, such constraints do not arise when the optical surface 9 is flat.

The embodiment shown in FIG. 8 thus differs from that of FIGS. 4 to 7 in that the wiper 19 has a larger dimension, the blade thus having a length 180 greater than the longitudinal dimension 160, of around 300 to 400 mm, of the optical surface 9, and in that the conversion device 29 is arranged facing one of the side edges 41 of the optical surface 9.

The principle of movement of the wiper 19 and the change in the positions of the various connecting rods 64 of the conversion device 29 between the first end position and the second end position is thus identical to that described above, with the difference that the conversion device 29 is arranged opposite one of the side edges 41 and that the articulated connecting member 31 is moved along the primary axis 210 which here extends along said side edge 41, substantially parallel to the transverse direction.

Since the transverse dimension 150 of the optical surface 9 is smaller than its longitudinal dimension 160, the distance traveled by the wiper 19 between the first end position, for example near the upper edge 37, and the second end position, for example near the lower edge 39, is smaller. This results in a reduction in the time taken for the cleaning operation but also a reduction in the size due to the drive device 21. To be specific, since the movement of the wiper 19 is of smaller extent, the scale of the "Peaucellier-Lipkin" conversion device 29 is itself reduced, the features concerning the relative arrangement of the various quadrilaterals nevertheless remaining similar to what has been described above.

Figure 9:
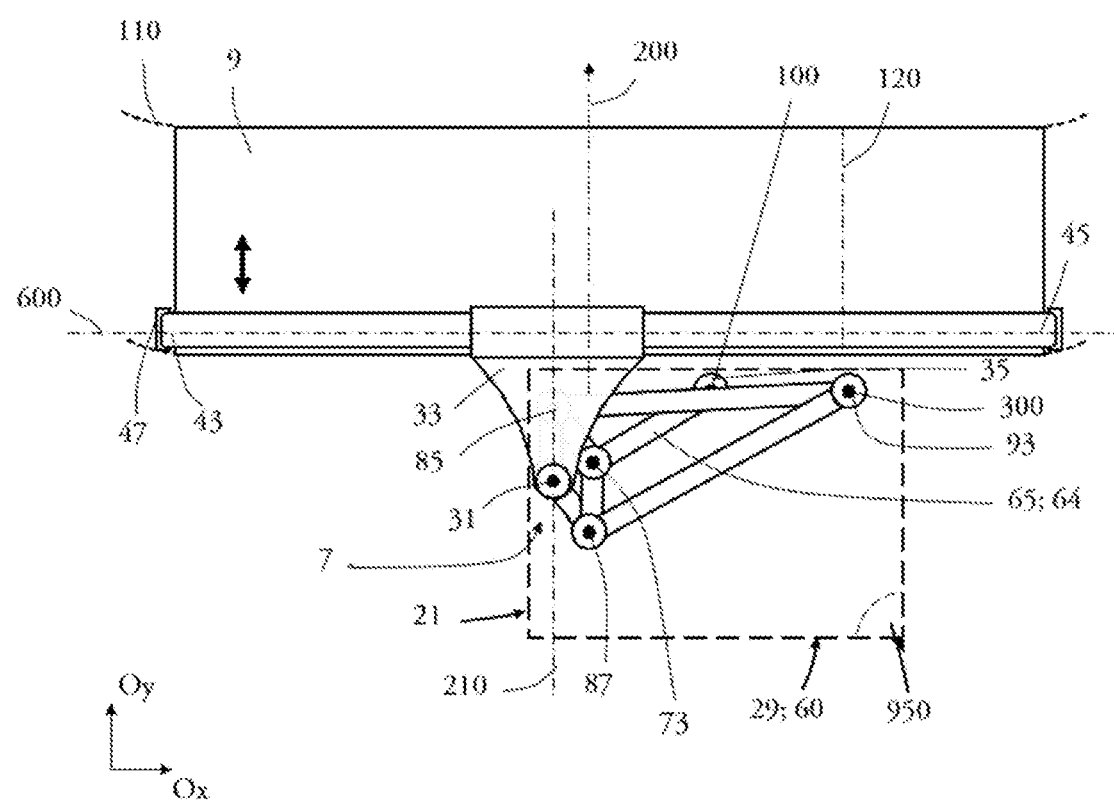
FIG. 9 schematically depicts the cleaning system produced according to an alternative of the first embodiment as shown in FIGS. 4 to 8.

In the example shown in FIG. 8, the connector 33 extends between the articulated connecting member 31 and the first axial end 43. Alternatively, and as shown in FIG. 9 or as described above in relation to FIG. 4, the connector 33 may be centered on the longest dimension of the wiper 19, between the first axial end 43 and the second axial end 45. Such a configuration helps reinforce the stability of the wiper 19 and limit misalignment of the line of extension 600 of the wiper 19 with respect to the perpendicular to the axis of translation 200. As mentioned above in relation to the embodiment shown in FIG. 4, the wiper 19 then preferably comprises the guide member 47 at each of its axial ends 43, 45 and the conversion device 29 is arranged at the lower edge 39 or upper edge 37.

Note that, as mentioned above, all of the examples and embodiments described above represent, for clarity, the conversion device 29 when it extends, as in FIG. 3, substantially parallel to the glazed surface to be cleaned. However, the examples shown in FIGS. 5 to 9, as well as any alternative or combination described that is associated therewith, may be adapted so that the conversion device 29 extends substantially perpendicular to the glazed surface.

Figure 10:
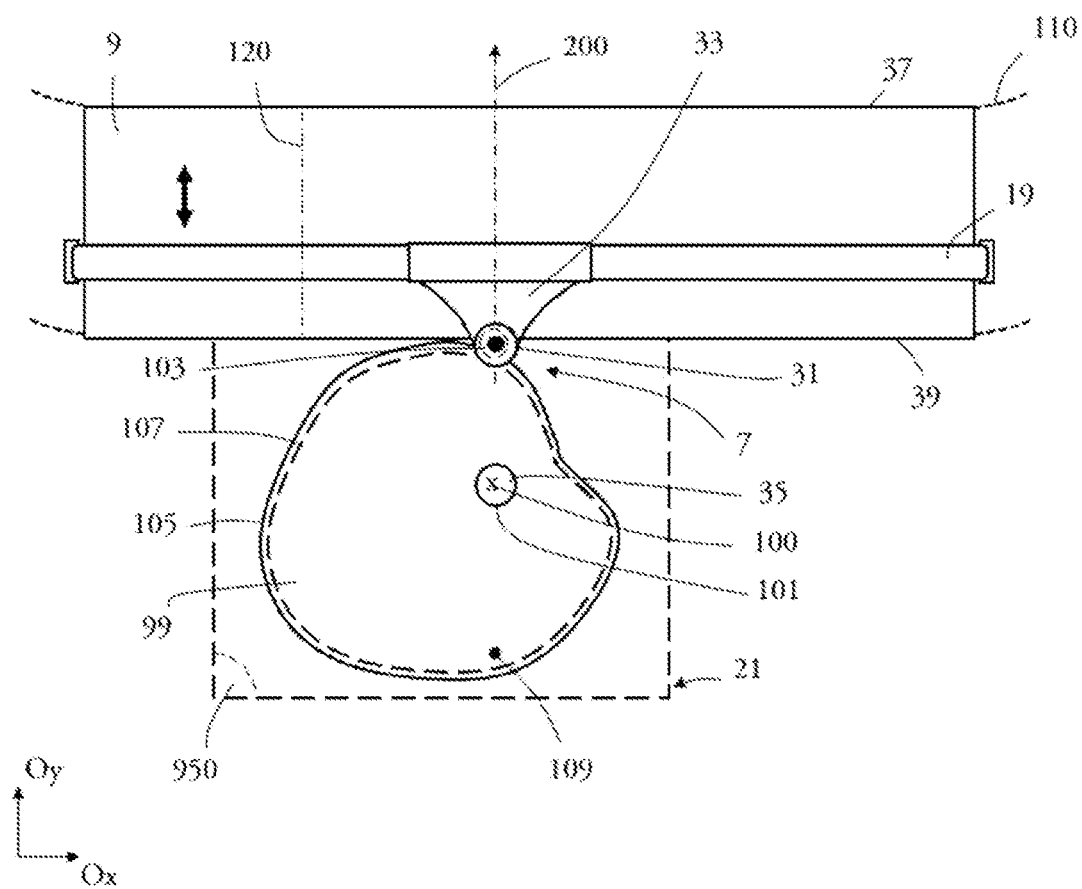
FIG. 10 schematically depicts the cleaning system produced according to a second embodiment.

FIG. 10 shows a second embodiment of the present invention, in which the conversion device 29 comprises at least one cam 99. The cam 99 is rotationally rigidly secured to an output shaft of the drive motor 27, so as to be able to pivot about the axis of rotation 100 substantially perpendicular to the glazed surface and to its generatrix 120. The cam has a hole 101 fitted around the output shaft, and this connection is configured to form the fixed motor articulation point 35.

The connector 33 providing the connection between the wiper 19 and the conversion device 29 comprises a pin 103 configured to move along a peripheral edge 105 of the cam 99. Said pin 103 extends in the direction of the cam 99, for example parallel to the axis of rotation 100 of the drive motor 27.

Alternatively, the connector 33 and the cam 99 may be configured such that the pin 103 can travel along a groove 107, shown in dotted line, made in the cam 99.

In order to move the wiper 19 between the first end position and the second end position, i.e. over the transverse dimension 150 of the optical surface 9, along the axis of translation 200, the cam 99 has an asymmetrical structure and the hole 101, through which the axis of rotation 100 of the drive motor 27 passes, is off-center.

Such a conversion device 29, comprising the cam 99, is implemented to ensure that the optical surface 9 is wiped along its transverse dimension 150, and not its longitudinal dimension 160 as mentioned above for FIGS. 4 to 7, in order to maintain acceptable dimensions of the cam 99 and to limit the size of the cleaning system 7.

In the example shown, the cam 99 has a flat structure, a main surface 109 of which is essentially included in the main plane 950, which extends substantially parallel to the glazed surface to be cleaned.

In order to limit obstruction of the field of vision of the optical sensor 5 during the pivoting of the cam 99, an alternative may be envisaged in which the conversion device 29 comprises a combination of the cam 99 and the connecting rod system 60, at least one connecting rod 64 being connected to the connector 33 and/or comprising the pin 103 configured to interact with the cam 99. In this way, when the wiper moves between the first end position and the second end position, respectively near the lower edge 39 and the upper edge 37 of the optical surface 9, the cam 99 is not interposed between the optical surface 9 and the surroundings outside the motor vehicle.

Advantageously, the conversion device 29 comprising the cam 99 may be arranged to ensure the cleaning fluid flows and is sprayed, the wiper 19 comprising, as explained above, the supply device and/or the distribution device. By way of example, the connector 33 may be equipped with the contactor and the cam with an activation member emerging from the main surface 109 and projecting from the cam 99, toward the connector 33.

It is understood on reading the foregoing that the present invention proposes a cleaning system for wiping a glazed surface, the glazed surface consisting of a detection surface of a sensor/transmitter. The cleaning system comprises a wiper and a drive device composed of a rotary drive motor and a device for converting the rotary movement of the motor into a rectilinear movement, the device driving the wiper in a rectilinear movement along the optical surface.

The invention also relates to a detection assembly comprising said cleaning system and the sensor/transmitter, the glazed surface of the sensor/transmitter possibly being flat or curved.

The cleaning system according to the present invention advantageously allows the use of a rotary drive motor conventionally used for cleaning glazed surfaces such as windshields.

The invention is, however, not limited to the means and configurations described and illustrated here, and it also encompasses any equivalent means or equivalent configuration and any technically workable combination of such means. In particular, the location of the connector, of the conversion device or of the guide member may be modified without adversely affecting the invention, as long as the cleaning system ultimately fulfills the same functions as described in this document.

What is claimed is:

1. A cleaning system for cleaning a glazed surface of a motor vehicle, comprising at least one wiper and a drive device for driving the at least the wiper along an axis of translation substantially perpendicular to the at least one wiper, with the drive device connected to the at least one wiper between the at least one wipers axial ends, with the at least one wiper including at least one guide member for guiding the wiper along the axis of translation positioned at one of the axial ends, wherein the glazed surface is a detection surface of a sensor or transmitter of a detection assembly and in that the drive device includes at least one drive motor for driving in rotation about an axis of rotation substantially perpendicular to the axis of translation, and at least one conversion device for converting the rotary movement of the drive motor into a rectilinear movement along the axis of translation.

2. The cleaning system as claimed in claim 1, wherein the conversion device includes an articulated connecting member to which the wiper is attached, by means of at least one connector.

3. The cleaning system as claimed in claim 2, wherein the connector is centered on the wiper.

4. The cleaning system as claimed in claim 1, wherein the conversion device includes at least a connecting rod system and a cam.

5. The cleaning system as claimed in claim 4, wherein the connecting rod system includes at least a first connecting rod, attached to the drive motor to form a fixed motor articulation point, and at least two articulated quadrilaterals of connecting rods, respectively a first quadrilateral of connecting rods and a second quadrilateral of connecting rods, an articulated connecting member being common to the first quadrilateral and to the second quadrilateral, the second quadrilateral including a fixed point of the conversion device.

6. The cleaning system as claimed in claim 1, wherein a connector is arranged at a first axial end of the wiper, the at least one guide member being arranged at a second axial end, opposite the first axial end, of the at least one wiper.

7. The cleaning system as claimed in claim 1, wherein the conversion device includes a fixed motor articulation point rotationally rigidly secured to an output shaft of the drive motor.

8. The cleaning system as claimed in claim 1, wherein the conversion device includes at least a connecting rod system or a cam.

9. A detection assembly for a motor vehicle, the detection assembly comprising at least one sensor or transmitter, with the at least one sensor or transmitter including at least one glazed surface, and at least one cleaning system, with the cleaning system including at least one wiper and a drive device for driving the at least the wiper along an axis of translation substantially perpendicular to the at least one wiper, with the drive device connected to the at least one wiper between the at least one wipers axial ends, with the at least one wiper including at least one guide member for guiding the wiper along the axis of translation positioned at one of the axial ends, wherein the glazed surface is a detection surface of a sensor or transmitter of a detection assembly and in that the drive device includes at least one drive motor for driving in rotation about an axis of rotation substantially perpendicular to the axis of translation, and at least one conversion device for converting the rotary movement of the drive motor into a rectilinear movement along the axis of translation.

10. The detection assembly as claimed in claim 9, wherein a main dimension of a blade of the at least one wiper is substantially equal to one of the dimensions, longitudinal or transverse, of the at least one glazed surface to be cleaned.

11. The detection assembly as claimed in claim 9, wherein the at least one glazed surface to be cleaned is curved, the at least one glazed surface being defined by at least a directrix and a generatrix, the axis of translation of the wiper extending parallel to at least the generatrix of the glazed surface of the sensor or transmitter.

12. A cleaning system for cleaning a glazed surface of a motor vehicle, comprising at least one wiper and a drive device for driving the at least the wiper along an axis of translation substantially perpendicular to the at least one wiper, wherein the glazed surface is a detection surface of a sensor or transmitter of a detection assembly and in that the drive device includes at least one drive motor for driving in rotation about an axis of rotation substantially perpendicular to the axis of translation, and at least one conversion device for converting the rotary movement of the drive motor into a rectilinear movement along the axis of translation, with the conversion device including at least a first connecting rod, attached to the drive motor to form a fixed motor articulation point, and at least two articulated quadrilaterals of connecting rods, respectively a first quadrilateral of connecting rods and a second quadrilateral of connecting rods, an articulated connecting member being common to the first quadrilateral and to the second quadrilateral, the second quadrilateral including a fixed point of the conversion device.

* * * * *